United States Patent [19]
Roberts et al.

[11] Patent Number: 5,999,283
[45] Date of Patent: Dec. 7, 1999

[54] OPTICAL LOGIC DEVICES AND METHODS

[76] Inventors: Kim Byron Roberts, 41 Sherrards Park Road, Welwyn Garden City AL8 7DL Hertfordshire; James Edward Andrew Whiteaway, 8 Falconers Park, Sawbridgeworth CM21 0AU Hertfordshire; Mark Tait, 3 The Orchard, Bengeo SG14 3HQ Hertford, all of United Kingdom

[21] Appl. No.: 08/858,321

[22] Filed: May 19, 1997

[51] Int. Cl.$^6$ .............................. G02F 3/00; G02F 27/00; G02F 1/035

[52] U.S. Cl. ................................. 359/108; 359/577; 385/3

[58] Field of Search ..................................... 359/107, 108, 359/577; 385/3, 24, 45; 250/227.19

[56] References Cited

U.S. PATENT DOCUMENTS

| | | | |
|---|---|---|---|
| 4,262,992 | 4/1981 | Berthold, III | 385/15 |
| 4,764,889 | 8/1988 | Hinton et al. | 364/807 |
| 4,823,360 | 4/1989 | Tremblay et al. | 375/214 |
| 4,932,739 | 6/1990 | Islam | 359/108 |
| 4,962,987 | 10/1990 | Doran | 359/108 |
| 5,315,422 | 5/1994 | Utaka et al. | 359/107 |
| 5,623,366 | 4/1997 | Hait | 359/108 |
| 5,781,326 | 7/1998 | Chiaroni et al. | 359/237 |

FOREIGN PATENT DOCUMENTS

| | | | |
|---|---|---|---|
| 0632313A1 | 1/1995 | European Pat. Off. | G02F 1/35 |
| 0813097A1 | 12/1997 | European Pat. Off. | G02F 1/35 |
| 2302225 | 1/1997 | United Kingdom | G02F 3/00 |

OTHER PUBLICATIONS

M. Schilling, et al., "Wavelength Converter Based on Integrated All–Active Three–Port Mach–Zehnder Interferometer", Electronics Letters, vol. 30, No. 25, pp. 2128–2130, Dec. 1994.

IEEE Photonics Technology Letters, vol. 8. No. 9, Sep. 1996 "10 Gb/s Wavelength Conversion with Integrated Multi-quantum– Well– Based 3–Port Mach–Zehnder Interferometer"—W. Idler et. al. pp. 1163–1165.

Electronics Letters, Nov. 11, 1993, vol. 29 No. 23 "Reduction of harmonic distortion and noise in a semiconductor optical amplifier using bias current feedback"—J.A. Constable et. al. pp. 2042–2044.

P. Doussiere, "Recent advances in conventional and gain–clamped semiconductor optical amplifiers", Topical Meeting on "Optical amplifiers and their applications", Jul. 11–13 1996, Monterey, California, paper SaBl–1. pp. 220–223.

Leos Newsletter Apr. 1997 "Continuous–Wave Operation of a Monolithically Integratable Two–mode Cross–coupled Optical Flip–Flop with Etched Laser Mirrors", Benjamin B. Jian. pp. 6–7.

Electronics Letters Jul. 2, 1992 vol. 28 No. 14 "All–Optical Regenerator based on Nonlinear Fibre Sagnac Interferometer"—M. Jinno and M. Abe. pp. 1350–1352.

Electronics Letters Jan. 7, 1993 vol. 29 No. 1 "Decision Gate for All–Optical Data Retiming using a Semiconductor Laser Amplifier in a Loop Mirror Configuration"—M. Eiselt et. al. pp. 107–109.

*Primary Examiner*—Cassandra Spyrou
*Assistant Examiner*—John Juba, Jr.
*Attorney, Agent, or Firm*—John D. Crane

[57] ABSTRACT

An optical logic device is provided by an interferometer having an output which defines a logic state 1 or 0 in dependence upon an interference condition existing in the interferometer. Each arm of the interferometer contains a semiconductor optical amplifier in which the effect of cross phase modulation is utilized to modulate the phase of light transmitted through the respective arms. Optical signals are counter propagated through one or both of the arms in order to provide the cross modulation and thereby enable the interference condition to be set to one or other of the logic states. Automatic level control is provided at inputs to the interferometer and between successive stages of logic device. The method has application to high frequency digital optical communication systems where all optical logic operations are required.

21 Claims, 5 Drawing Sheets

OPTICAL LOGIC DEVICES AND METHODS

FIELD OF THE INVENTION

This invention relates to optical logic devices and methods for use in digital optical communication systems.

BACKGROUND TO THE INVENTION

Optical communication systems typically handle optical pulses with frequencies in the range 2 to 10 gHz with the next generation of systems being expected to handle signals with frequencies up to 40 gHz. In existing systems, logic functions are performed on the pulsed signals as part of regeneration, error detection and clock recovery processes for example, it being typically necessary to convert the optical signals to electrical signals and to reconvert electrical signals to optical signals after performing logical operations and other processing.

The tendency for higher frequency signals means that it is increasingly desirable to avoid such conversion to electronic signals because of the difficulty and expense of high frequency electronic processing.

A number of optical logic devices and methods exist for performing logical operations without conversion to electrical signals but hitherto have proved unsatisfactory in the context of the above communication systems.

It is known from U.S. Pat. No. 4,764,889 (Hinton et al) to provide optical logic arrangements with self electro-optic effect devices for use in an optical digital processor. Control light beams are directed onto electro-optic devices in two dimensional arrays such that elements of the arrays have eight transmission or reflection characteristics which are optically controlled. Such arrangements are however suited to relatively low frequency parallel processing rather than logical functions between signals confined within waveguides.

Berthold discloses in U.S. Pat. No. 4,262,992 optical logic elements which operate on the principle of constructive and destructive interference between light beams, the refractive index of certain waveguides being controlled by applied voltages to produce relative phase differences in the propagated signals. A necessary condition for operation however is that optical signals are carried by input lights beams which are coherent, in phase and of equal amplitude which will seldom be the case in a practical communication system.

It is known from U.S. Pat. No. 4,932,739 (Islam) to provide logic functions which utilise soliton trapping between two optical signals propagated in a birefringent fibre. The technic however relies upon the use of frequency filters and polarisers. A further disadvantage is that, where a logic function is to be performed between two optical signals, both optical signals must be in the form of pulses having similar characteristics. Since the soliton trapping effect is associated with very long fibre lengths, it is anticipated that the lengths of fibre required would make use of such techniques impracticable.

It is known from Idler et al (IEEE Photonics Technology Letters, Vol. 8, No. 9, September 1996—"10 Gb/s Wavelength Conversion with Integrated Multiquantum-Well-Based 3-Port Mach-Zehnder Interferometer") to provide inversion of a single optical signal in addition to wavelength conversion by means of a Mach-Zehnder interferometer in which semiconductor optical amplifiers are utilised to set an interference condition between optical components of an input signal transmitted through first and second arms of the interferometer. A continuous wave optical signal propagated equally through the first and second arms is recombined to form an output signal which is modulated according to the interference condition and a pulsed optical signal is counter-propagated through only one of the arms so as to modulate the phase of one of the component signals by cross-phase modulation due to the non-linear characteristics of the semiconductor optical amplifier in that arm.

There remains a need for a practical technique for performing optical logic in an optical communication system.

SUMMARY OF THE INVENTION

It is object of the invention to provide an improved optical logic devices and methods.

According to the present invention there is disclosed a method of performing a logical operation between first and second optical signals carrying information encoded by modulation between signal states representative of logic states, the method comprising the steps of:

inputting the first optical signal to an interferometer having first and second arms such that the first optical signal is divided into first and second component signals propagated through the first and second arms respectively;

outputting an output signal from the interferometer formed as a sum of the first and second component signals such that the output signal is modulated between signal states representative of logic states according to the signal state of the first optical signal and according to whether an interference condition exists between the first and second component signals;

inputting the second optical signal to the interferometer such that the second optical signal is propagated in an optical amplifier constituting the first arm;

and modulating the phase of the first component signal by a process of cross modulation by propagation of the second optical signal in the optical amplifier of the first arm, whereby the interference condition is set according to the signal state of the second optical signal.

Preferably the second optical signal is counter propagated in the first arm relative to the first component signal and the first and second optical signals are amplitude modulated between bi-level signals states representative of logic states 1 and 0. Preferably the arms of the interferometer are constituted by semiconductor optical amplifiers in which cross phase modulation occurs in response to the first and second optical signals.

According to a second aspect of the present invention there is disclosed a method of performing a logical operation between first and second optical signals carrying information encoded by modulation between signal states representative of logic states, the method comprising the steps of:

inputting a continuous optical signal to an interferometer having first and second arms such that the continuous optical signal is divided into first and second component signals propagated through the first and second arms respectively;

outputting an output signal from the interferometer formed as a sum of the first and second component signals such that the output signal is modulated between signal states representative of logic states according to whether an interference condition exists between the first and second component signals;

inputting the first and second optical signals to the interferometer such that the first and second optical signals are propagated in the first and second arms respectively;

modulating the phase of the first component signal by a process of cross modulation by propagation of the first optical signal in the first arm;

and modulating the phase of the second component signal by a process of cross-phase modulation by propagation of the second optical signal in the second arm, whereby the interference condition is set according to the signal states of the first and second optical signals.

Preferably the first and second optical signals are propagated in the first and second arms in directions counter to the directions of propagation of the first and second component signals respectively. The first and second optical signals are preferably amplitude modulated between bi-level signal states representative of logic states "1" and "0".

The method and apparatus of the present invention may be used to provide various logic functions between first and second optical signals.

BRIEF DESCRIPTION OF THE DRAWINGS

For a better understanding of the invention and how the same may be carried into effect, preferred embodiments will now be described by way of example only and with reference to the accompanying drawings, of which:

In FIG. 1, an interferometer 1 of a first type comprises a Mach-Zehnder interferometer of the non-loop configuration in which a first input waveguide 2 is divided into first and second arms 3 and 4 which are subsequently recombined to form an output waveguide 5. A second input waveguide 6 is coupled to the first arm adjacent to the output waveguide 5 so as to allow injection of optical signals to the first arm 3 in a counter-direction relative to propagation from the first input waveguide 2 to the output waveguide 5. A third input waveguide 7 is similarly coupled to the second arm 4 such that the first and second arms 3 and 4 are coupled to the second and third input waveguides in a symmetrical manner.

Figure 2:
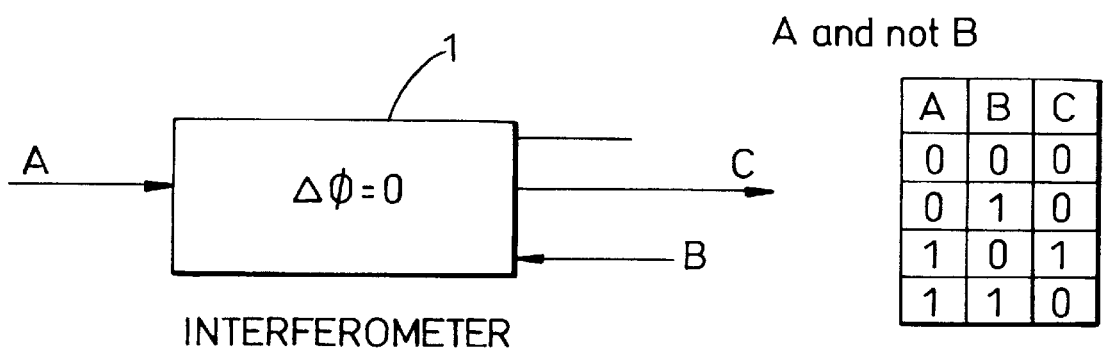
FIG. 2 is a block diagram of the device of FIG. 1 and a truth table illustrating the "A and not B" function.

The first arm 3 includes a first semiconductor optical amplifier 8 and the second arm 4 is similarly provided with a second semiconductor optical amplifier 9. Each of the semiconductor optical amplifiers 8 and 9 is configured to operate as a travelling wave amplifier with internal reflections being suppressed in known manner. The semiconductor optical amplifiers 8 and 9 are each supplied with bias currents which are maintained at controlled levels determined according to a required phase relationship between the optical signals transmitted to the output waveguide 5. In the absence of counter-propagating optical signals injected via the second and third input waveguides 6 and 7, there are two possible biasing conditions which are useful in the context of the devices of the present invention. In the first case, an input signal A injected into the first input waveguide 2 is divided into first and second components A1 and A2 which experience equal phase delays when being transmitted through the first and second arms 3 and 4 including the semiconductor optical amplifiers 8 and 9 such that they recombine with constructive interference at the output waveguide 5. This bias condition is represented in FIG. 2 and in subsequent Figures where this bias condition applies as a phase difference $\Delta\phi=0$. An output optical signal C would then replicate the input optical signal A.

The bias condition is however set up such that when a second optical signal B is injected for counter-propagation via the second input waveguide 6, the first component A1 experiences a phase shift of $\pi$ when propagated through the first semiconductor optical amplifier due to the non-linear properties of the amplifier material resulting in cross-phase modulation. The resulting output signal C would then be modulated to a zero state by destructive interference between the out of phase first and second components A1 and A2.

The interferometer 1 in this configuration as shown in FIG. 2 provides the logic function of "A and not B" as illustrated in the truth table of FIG. 2 in which "0" represents a logic state of optical signals A, B and C of zero intensity and "1" represents a binary-one logic state in which the intensity of the signals A, B and C corresponds to a predetermined level.

Figure 3:
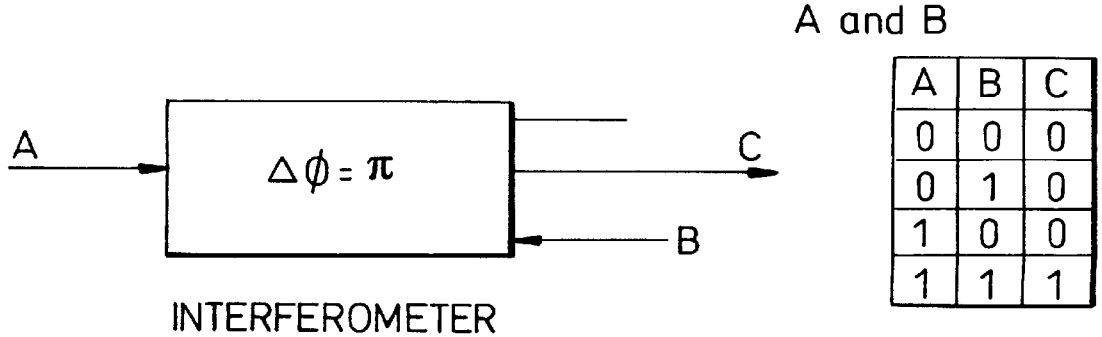
FIG. 3 is a block diagram of the device of FIG. 1 and a truth table illustrating the "A AND B" function.

The semiconductor optical amplifiers 8 and 9 may alternatively be biased such that, in the absence of counter-propagating signal B, a phase difference of $\pi$ exists in the recombined components at the output waveguide 5, thereby providing a zero state for output signal C, this bias condition being represented by $\Delta\phi=\pi$ as illustrated in FIG. 3 and in subsequent Figures where this bias condition applies. In the presence of the counter-propagating second optical signal B, the phase of the first component A1 is modulated by a phase increment of $\pi$ such that the first and second components A1 and A2 combined with constructive interference in the output waveguide 5, thereby providing logic state "1" as the output signal C. As shown in the truth table of FIG. 3, the bias condition corresponding to $\Delta\phi=\pi$ gives a logic device performing the function "A AND B".

In the above described interferometer, the third input waveguide 7 is not utilised and may therefore be omitted. It is however conveniently retained to preserve symmetry in the structure of the first and second arms 3 and 4 and would allow a device of the same physical structure to be utilised in the following alternative configuration described for example with reference to FIG. 4.

Figure 1:
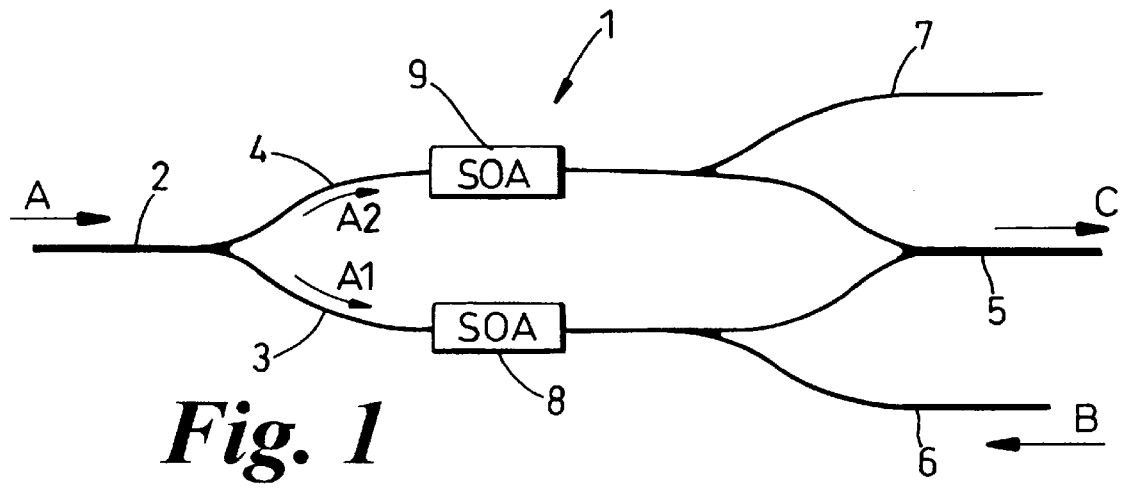
FIG. 1 is a schematic diagram of a logic device in accordance with the present invention.
Figure 4:
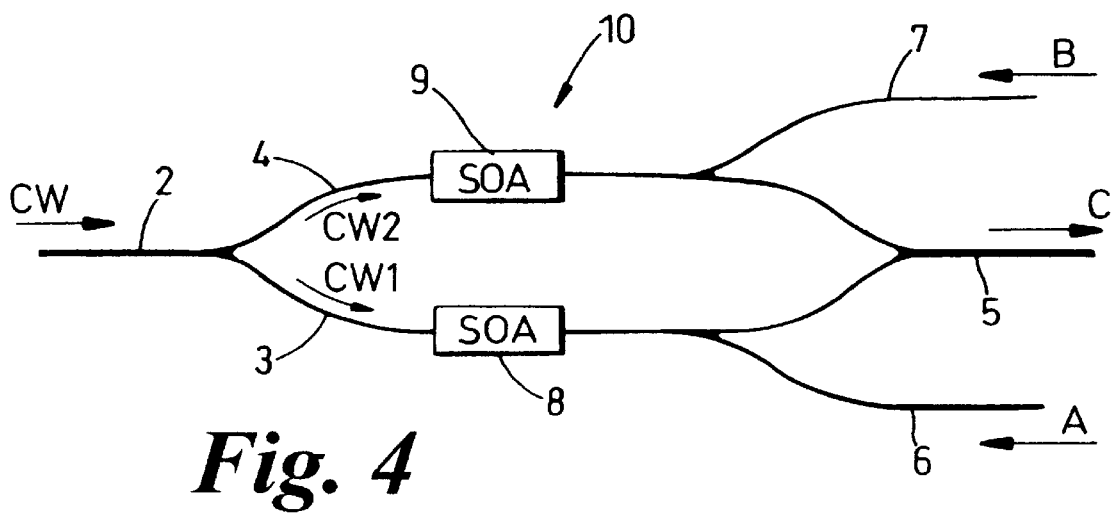
FIG. 4 is a schematic diagram of a further device in accordance with the present invention.

FIG. 4 illustrates a further logic device 10 corresponding to the interferometer 1 of FIG. 1 but additionally coupled to receive a counter-propagating signal via the third input waveguide 7. In the device 10 of FIG. 4, a continuous wave optical signal CW is input to the first input waveguide 2 and divided into first and second components CW1 and CW2 propagated through the first and second arms 3 and 4. The components CW1 and CW2 are recombined to form output signal C to provide logic state "1" or "0" depending upon an interference condition existing in the interferometer, as defined by the manner in which the semiconductor optical amplifiers 8 and 9 are biased. Taking as a first example the case where the relative phase difference introduced by the semiconductor optical amplifiers in the absence of counter-propagating input signals is zero, i.e. the $\Delta\phi=0$ condition illustrated schematically in FIG. 5, in the absence of input signals A and B the output signal C assumes a continuous wave signal, corresponding to logic state 1. A first optical signal A injected via the second input waveguide 6 for counter-propagation through the first semiconductor optical amplifier 8 results in a phase change of $\pi$ in the propagation of the first component CW1 via the first arm 3 such that the interference condition is altered to provide logic state "0" at the output signal C. If A has a "0" state, injection of a second optical signal B via the third input waveguide 7 causes a phase change of $\pi$ in the second semiconductor optical amplifier 9 so that similarly the logic state "0" is assumed by the output signal C. If however both A and B have logic state "1", thereby resulting in the phase difference $\pi$ being introduced into both first and second arms 3 and 4, constructive interference occurs at the output signal C which assumes logic state "1".

Figure 5:
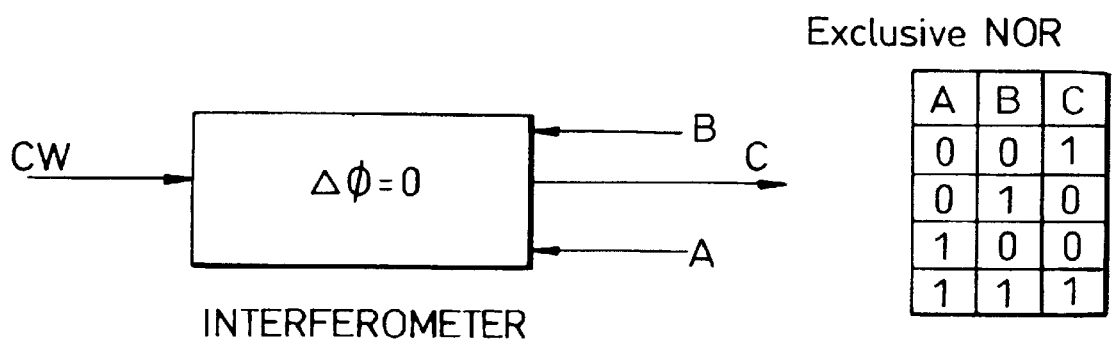
FIG. 5 is a block diagram of the device of FIG. 4 and a truth table illustrating the "exclusive NOR" function.

As illustrated in the truth table of FIG. 5, this $\Delta\pi=0$ bias condition results in the logic function of "exclusive NOR".

Figure 6:
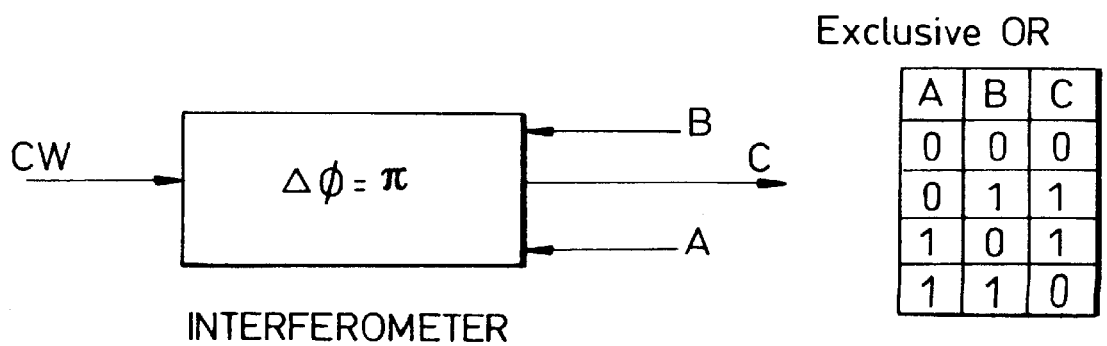
FIG. 6 is a block diagram of the device of FIG. 4 and a truth table illustrating the "exclusive OR" function.

Alternatively, the semiconductor optical amplifiers 8 and 9 of FIG. 4 may be biased such that, in the absence of counter-propagating input signals A and B, a phase differential $\pi$ is introduced between the first and second arms 3 and 4 so that continuous wave input results in zero state output signal C. Constructive interference can be restored by injecting either one of counter-propagating optical signals A and B. If however both A and B have logic state "1", the phase differential $\pi$ is maintained and output signal C assumes zero state. As illustrated in the truth table of FIG. 6, this bias condition results in the logic function "exclusive OR".

Figure 7:
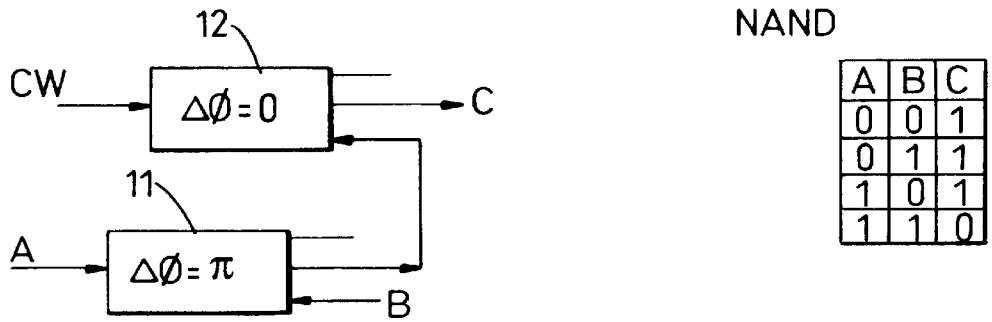
FIG. 7 is a block diagram of a combination of logic devices, each being of the type shown in FIG. 1 and a truth table illustrating the "NAND" function.

Further logic devices may be formed by combining two or more of the devices shown in FIGS. 1 and 4 as shown for example in FIG. 7 where the output of a first interferometer 11 is used as an input to a second interferometer 12. The first interferometer 11 of FIG. 7 is of the type described above in FIG. 1 and in which a first optical signal A is input to the first input waveguide 2, a second optical signal B being input to the second input waveguide 6. The semiconductor optical amplifiers are biased to provide a phase differential of $\Delta\phi=\pi$ in the absence of counter-propagating signals such that, as described above with reference to FIG. 3, the first interferometer 11 provides the function "A AND B". The output signal of the first interferometer 11 is input to the second input waveguide 6 of the second interferometer 12 so as to be counter-propagated in the first arm of the second interferometer, in opposition to a continuous wave optical signal CW input to the first input waveguide 2. The second interferometer 12 is biased to provide a phase differential of $\Delta\phi=0$ in the absence of counter-propagating signals as described above with reference to FIG. 2 in the "A and not B" configuration. As shown in the truth table of FIG. 7, the resulting combination of the first and second interferometers 11 and 12 provides the logical function "NAND".

Figure 8:
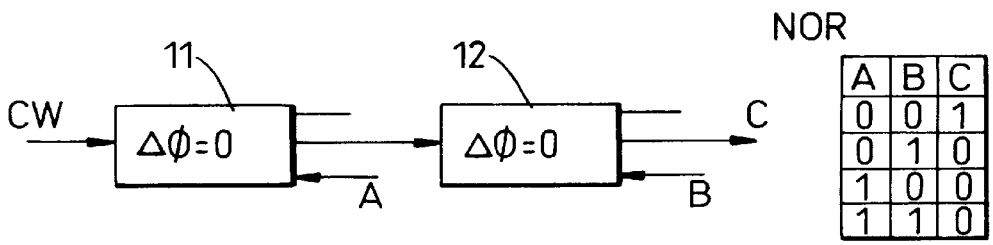
FIG. 8 is a block diagram of a further combination of logic devices of the type shown in FIG. 1 and a truth table illustrating the "NOR" function.

A further alternative device is shown in FIG. 8 which will be described using corresponding reference numerals to those of preceding Figures. A first interferometer 11 is biased to provide phase differential $\Delta\phi=0$ in the absence of counter-propagating signals and receives a continuous wave input to the first input waveguide 2. A first optical signal A is input via second input waveguide 6 to be counter-propagated in the first arm 3, the first interferometer 11 thereby functioning as an inverter since the output signal appearing at the output waveguide 5 of the first interferometer 11 assumes logic state "1" when A is 0 and the output assumes logic state "0" when A has logic state "1". The output signal from the first interferometer 11 is input to the first input waveguide 2 of the second interferometer 12 which is also biased to provide phase differential $\Delta\phi=0$ in the absence of counter-propagating signals. As shown in the truth table of FIG. 8, the composite effect of the first and second interferometers 11 and 12 is to provide the logical function "NOR".

A further alternative logic device is now described with reference to FIG. 9 using corresponding reference numerals to those of preceding figures. The device of FIG. 9 consists of first and second interferometers 11 and 12 corresponding exactly to those of the device of FIG. 8, the output signal from the second interferometer 12 being input to a third interferometer 13 which is configured as an inverter to provide inversion in the manner described above with reference to the first interferometer 11 of FIG. 8. The composite effect of the first, second and third interferometers 11, 12 and 13 is indicated in the truth table of FIG. 9 to provide the logic function "OR".

The above described logic operations may be described as "all-optical logic functions" in that logic functions between optical signals are performed without conversion to the electrical domain. Such all-optical logic functions are particularly useful in applications where logic functions are to be performed at an inaccessible location such that it is desirable to locate electronic equipment at an accessible base station. All optical logic functions may thereby be performed at the inaccessible location by transmitting control optical signals from the base station.

Figure 10:
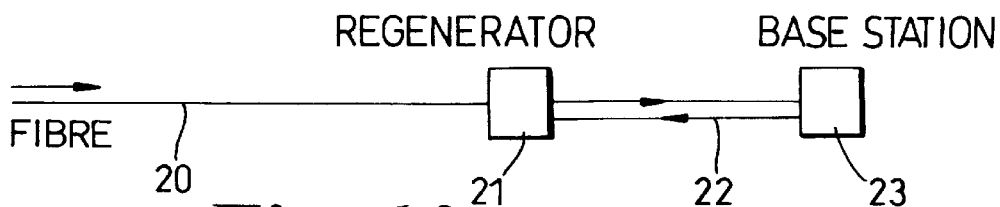
FIG. 10 is a schematic diagram illustrating remote operation of a regenerator.

As example is illustrated in FIG. 10 in which a long haul optical transmission fibre 20 is connected to a regenerator 21 at an inaccessible location, all-optical logic functions being performed in the regenerator in response to control optical signals 22 transmitted to the regenerator from a base station 23 located at an accessible location. The long haul transmission fibre 20 may for example perform transmission over a distance of 200 kms and the regenerator 21 may be located at an undersea location. The control optical signals 22 may be transmitted via a fibre of perhaps 10 kms length from the base station 23. In this example, the control optical signals 22 may include clock recovery signals for performing clock recovery in the regenerator.

Figure 11:
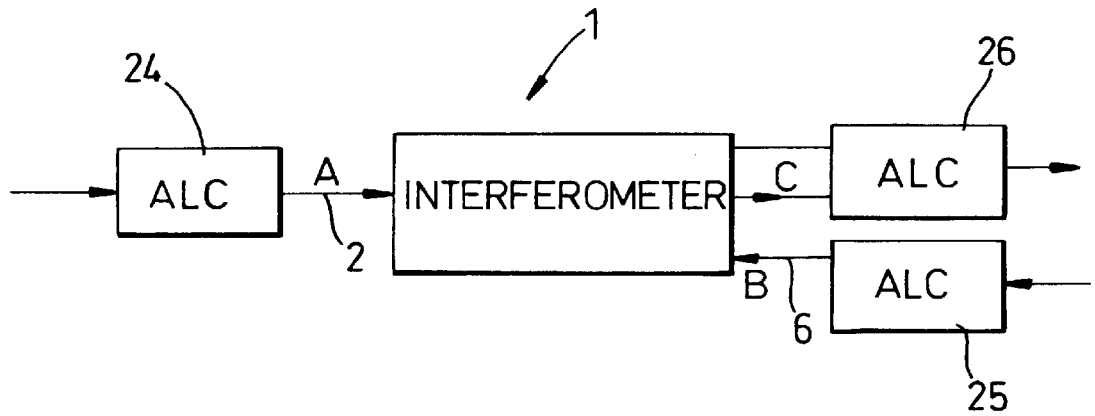
FIG. 11 is a block diagram illustrating automatic level control of signals input and output from the interferometer of FIG. 1.

In each of the above described embodiments, semiconductor optical amplifiers are set at controlled bias conditions to achieve a desired phase condition and a desired phase differential in response to signal propagation. In order to determine the bias conditions for the semiconductor optical amplifiers in terms of the supply voltage required for operation, it is necessary to determine the levels of optical signals corresponding to logic states "1" and "0" and those levels to respectively remain constant. Optical signal levels may be required using automatic control of signal levels as illustrated for example in FIG. 11 where an interferometer 1 of the type described above with reference to FIG. 1 receives first and second optical signals A and B and outputs an optical output signal C to a further stage (not shown). The signals A and B consist of high frequency amplitude modulated optical signals which are modulated between a peak amplitude and zero amplitude to represent logic states "1" and "0" respectively.

A first automatic level control (ALC) unit 24 is connected to the first input waveguide 2 and operates to regulate the amplitude of the first optical signal A. A second ALC unit 25 is connected to the second input waveguide 6 and similarly regulates the amplitudes of the second optical signal B. Correct operating conditions for achieving the desired phase relationships are therefore maintained in the interferometer 1. The output signal C is similarly processed by means of a third ALC unit 26 so that the output signal may be input to a further logic device in the manner described above with reference for example to FIGS. 7, 8 and 9.

Figure 12:
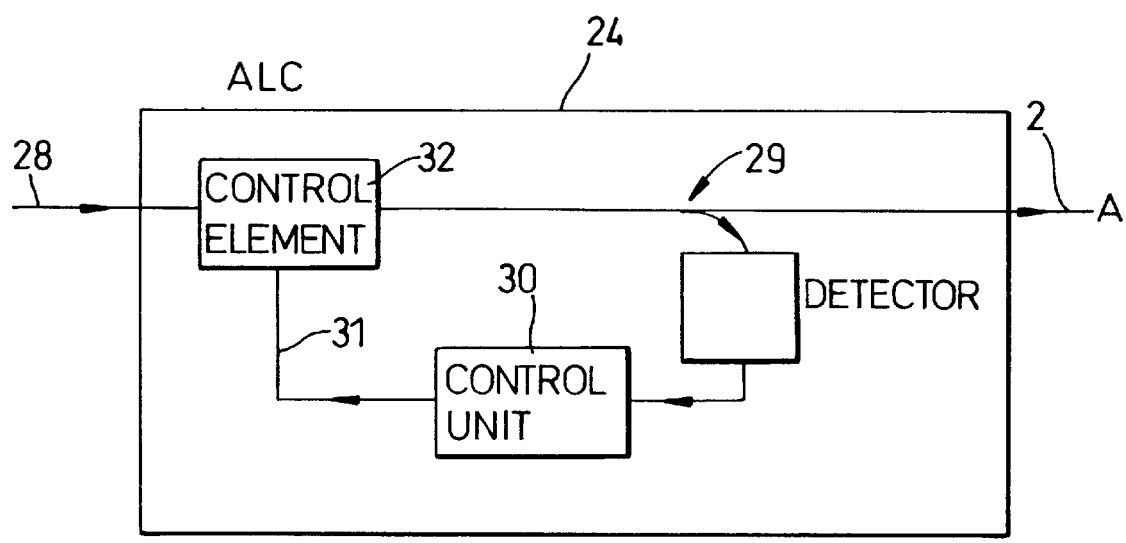
FIG. 12 is a schematic diagram of an automatic level control unit of FIG. 11.

The first ALC unit 24 is shown in greater detail in FIG. 12 to comprise a detector 27 coupled to waveguide 2 by means of a coupler 29 to thereby detect a sample of the first optical signal A. A control unit 30 processes the electronic output of the detector 27 to generate a feedback signal 31 which is input to a control element 32. The control element 32 receives the first optical signal A via an input waveguide 28 and operates to regulate the amplitude of the first optical signal A which is output to the first input waveguide 2 of the interferometer 1.

The control unit 30 operates to average the measured signal power with a time constant of the order of several milliseconds, thereby providing an indication of average power in the high frequency first optical signal A. The feedback signal 31 is determined so as to adjust the operation of the control element 32 such that the average amplitude of the output first optical signal A is maintained constant. This arrangement assumes that signal A is a high frequency signal for which the assumption holds that the average amplitude is a constant fraction of the peak amplitude. For signals in which this assumption does not hold true, the control unit 30 comprises a circuit for sampling signal pulses to directly measure amplitude, the feedback signal 31 then being adjusted to control the peak amplitude accordingly.

In the preferred embodiments, the detector 29 is a photodiode and the control unit 30 is a digital processor. The control element 32 is preferably a semiconductor optical amplifier which applies a variable gain determined in accordance with the feedback signal 31. An example of how the operation of a semiconductor optical amplifier can be controlled using bias current feedback is described by J A Constable et al in "Reduction Of Harmonic Distortion And Noise in A Semiconductor Optical Amplifier Using Bias Current Feedback"; Electronics Letters, Nov. 11, 1993, Vol. 29, No. 23. Other forms of variable gain devices may be used as control element 32 such as rare earth, Raman and parametric amplifiers.

The control element 32 may alternatively provide variable attenuation. An example of a variable absorption device would be an electro-absorption modulator having an absorption which varies with reverse bias. A Mach-Zehnder interferometer may alternatively be used as a variable attenuator, one arm of the interferometer being provided with a phase shift modulator such as an integrated heating element operable in response to the feedback signal 31 to regulate the temperature of a waveguide forming the interferometer arm.

The amplitude of the optical signal A may be detected by means other than a photodiode. Where for example the control element 32 is an optical amplifier, the amplified stimulated emission form the front, back or side of the amplifier may be monitored as a measure of amplifier output. The current-voltage characteristic of a semiconductor laser amplifier may also be interpreted to determine its optical output. Similar techniques may also be applied where the control element 32 provides attenuation, depending upon the structure of the attenuating device.

The automatic level control device 24 may alternatively make use of a self-limiting effect in a device by using for example the saturation effect in an amplifier or absorber.

Figure 9:
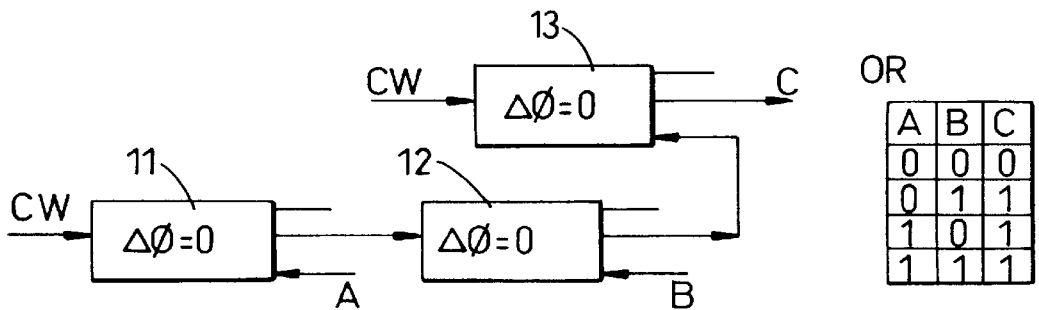
FIG. 9 is a block diagram of a further combination of logic devices of the type shown in FIG. 1 and a truth table illustrating the "OR" function.
Figure 13:
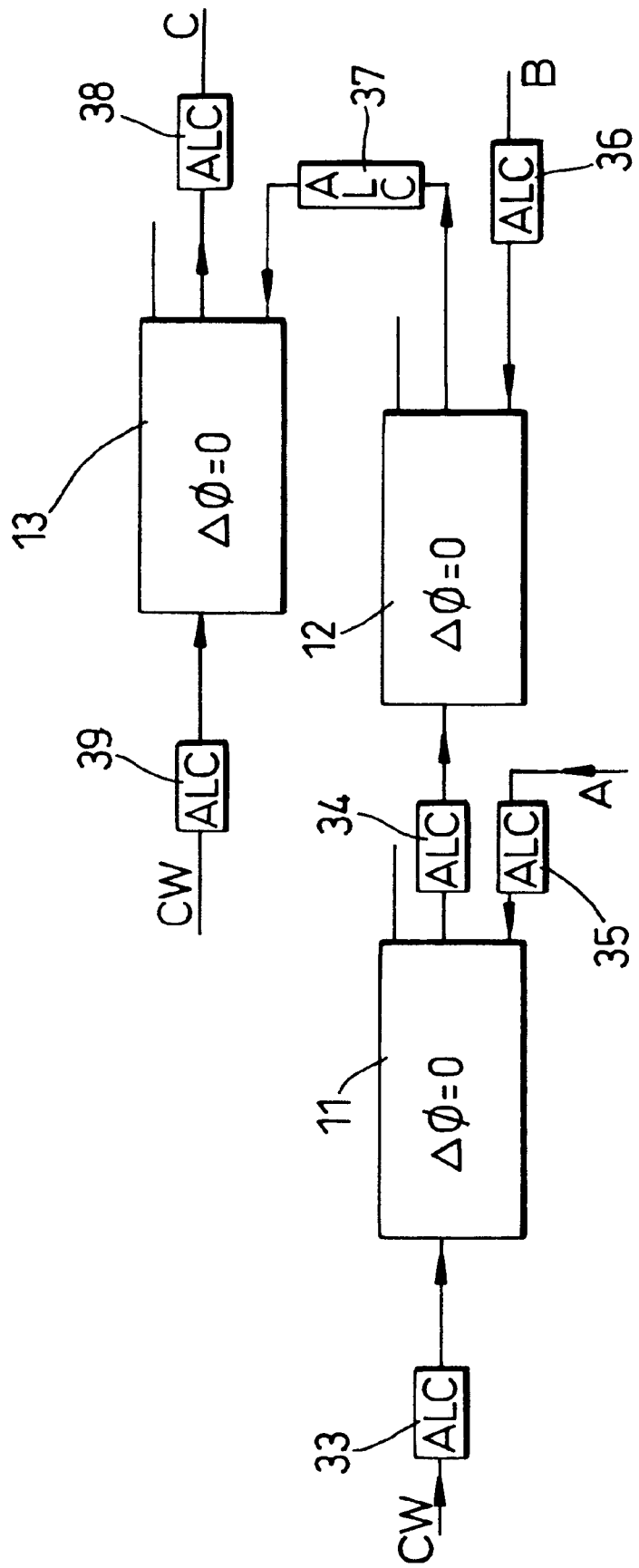
FIG. 13 is a schematic diagram illustrating the insertion of automatic level control units to the arrangement of FIG. 9.

FIG. 13 illustrates schematically the manner in which automatic level control units 33 to 39 might be introduced into the arrangement of the logic device shown in FIG. 9 to provide the function "OR". ALC units 33 and 39 used to control the input of continuous wave signals may be omitted if the amplitude of the continuous wave signal is locally controlled at source. The ALC unit 38 is provided at the output in readiness for input of the signal C to a further logic state.

Each of the input optical signals A and B is provided with ALC units 35, 36 to perform the function described above with reference to FIG. 11 and the ALC units 34 and 37 control the signal amplitude between logic devices 11, 12 and 13.

Alternative embodiment of the present invention are envisaged in which for example the interferometer arrangement of FIG. 4 is modified to receive a third optical signal via the first input waveguide 2 to form the first and second components propagated through the first and second arms 3 and 4 respectively. Such a third optical signal would be modulated to represent logic states in a similar manner to the first and second signals A and B and the resulting output signal C would be a logical combination of A, B and the third optical signal. Two possible configurations would correspond to $\Delta\phi=0$ and $\Delta\phi=\pi$.

A further alternative embodiment utilises co-propagating signals in the interferometer so that for example in the diagram of FIG. 1, both the first and second optical signals A and B would be input to co-propagate via the first arm 3. (This could be achieved for example by propagating the first signal A from waveguide 5 to waveguide 2, the output signal C being output from waveguide 2). By using signals A and B having different frequencies and adding a filter to eliminate B from the output, the same logical functions as shown in FIGS. 2 and 3 would then be obtained. Alternatively, separation of co-propagating signals A and B could be achieved by having respective orthogonal polarisation states and using a polarisation analyser at the output. Corresponding co-propagating variants exist to the remaining described embodiments.

Devices described above in accordance with the present invention may comprise semiconductor optical amplifiers and waveguides formed integrally in a single semiconductor device.

It is envisaged that a plurality of devices described above in accordance with the present invention will be interconnected such that, for example, the output of one logic device will provide a means of encoding an optical signal by amplitude modulation to provide an input optical signal to a subsequent logic device, as described above, for example, with reference to FIGS. 7, 8 and 9.

Other variations will be apparent to a person skilled in the art, falling within the scope of the appended claims.

We claim:

1. A method of performing a logical operation between first and second optical signals carrying information encoded by modulation between signal states representative of logic states, the method comprising the steps of:

inputting the first optical signal to an interferometer having first and second arms such that the first optical signal is divided into first and second component signals propagated through the first and second arms respectively;

outputting an output signal from the interferometer formed as a sum of the first and second component signals such that the output signal is modulated between signal states representative of logic states according to the signal state of the first optical signal and according to whether an interference condition exists between the first and second component signals;

inputting the second optical signal to the interferometer such that the second optical signal is propagated in an optical amplifier constituting the first arm;

controlling the signal level of at least one of the first and second optical signals by operation of a control element;

and modulating the phase of the first component signal by a process of cross modulation by propagation of the second optical signal in the optical amplifier of the first arm, whereby the interference condition is set according to the signal state of the second optical signal.

2. A method as claimed in claim 1 wherein the second optical signal is propagated in the first arm in a direction counter to the direction of propagation of the first component signal.

3. A method as claimed in claim 1 wherein each of the first and second optical signals is amplitude modulated between bilevel signal states representative of logic states "1" and "0".

4. A method as claimed in claim 1 wherein the output signal is amplitude modulated between bilevel signal states representative of logic states "1" and "0".

5. A method as claimed in claim 1 wherein the phase of the first component signal is modulated by cross-phase modulation in a semiconductor optical amplifier constituting the optical amplifier of the first arm.

6. A method as claimed in claim 5 wherein the second component signal is transmitted through a second semiconductor optical amplifier constituting the second arm of the interferometer.

7. A method as claimed in claim 1 wherein, under conditions such that the second optical signal is representative of "0" logic state, a constructive interference condition exists for transmission of the first and second component signals.

8. A method as claimed in claim 7 wherein the logical operation of "A and not B" is performed where A is a logic state represented by the first optical signal and B is a logic state represented by the second optical signal.

9. A method as claimed in claim 1 wherein, under conditions in which the second optical signal is representative of "0" logic state, a destructive interference condition exists for propagation of the first and second component signals.

10. A method as claimed in claim 9 wherein the logical operation of A AND B is performed where A is a logic state represented by the first optical signal and B is a logic state represented by the second optical signal.

11. A method as claimed in claim 1 wherein at least one of the first and second optical signals is remotely transmitted to the interferometer.

12. A method as claim in claim 1 including the steps of monitoring the signal level of the at least one of the first and second optical signals to obtain a monitored level and adjusting the control element to maintain the monitored level equal to a predetermined value.

13. A method as claimed in claim 1 wherein the control element is a self limiting device.

14. A method as claimed in claim 1 wherein the control element comprises a semiconductor optical amplifier.

15. A method as claimed in claim 1 wherein a plurality of logical operations are performed in successive stages, including the step of controlling the signal level of an output signal from a first stage before inputting the controlled signal as an input signal to a successive stage.

16. Apparatus for performing a logical operation between optical signals comprising:

amplitude modulating means operable to encode information in first and second optical signals by modulation between signal states representative of logic states;

first input means operable to input the first optical signal to an interferometer having first and second arms such that the first optical signal is divided into first and second component signals propagated through the first and second arms respectively;

the interferometer being operable to output an output signal formed as a sum of the first and second component signals such that the output signal is modulated between signal states representative of logic states according to the signal state of the first optical signal and according to whether an interference condition exists between the first and second component signals;

second input means operable to input the second optical signal to the interferometer such that the second optical signal is propagated in the first arm;

control means operable to control the signal level of at least one of the first and second optical signals by operation of a control element;

and phase modulating means operable to modulate the phase of the first component signal by a process of cross-phase modulation by propagation of the second optical signal in the first arm, whereby the interference condition is set according to the signal state of the second optical signal.

17. Apparatus as claimed in claim 16 wherein the second optical signal is propagated in the first arm in a direction counter to the direction of propagation of the first component signal.

18. Apparatus as claimed in claim 17 wherein the phase modulation means comprises a first semiconductor optical amplifier constituting the first arm.

19. Apparatus as claimed in claim 18 comprising a second semiconductor optical amplifier constituting the second arm of the interferometer.

20. A system for performing all-optical logic operations between optical signals, the system comprising a plurality of interconnected logic devices operable to process the optical signals, and wherein the logic devices comprise respective interferometers in which an interference condition is determined by a process of cross phase modulation occurring in counter-propagative mode.

21. A system for performing all-optical logic operations between optical signals, the system comprising a plurality of interconnected logic devices operable to process the optical signals and control elements operable to control the signal levels of the optical signals, and wherein the logic devices comprise respective interferometers in which an interference condition is determined by a process of cross phase modulation.

* * * * *